United States Patent
Williams

(10) Patent No.: US 8,416,986 B2
(45) Date of Patent: Apr. 9, 2013

(54) METHODS AND SYSTEMS FOR PROCESSING DATA USING NON-LINEAR SLOPE COMPENSATION

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 772 days.

(21) Appl. No.: 12/608,374

(22) Filed: Oct. 29, 2009

(65) Prior Publication Data

US 2011/0103692 A1 May 5, 2011

(51) Int. Cl.
 G06K 9/00 (2006.01)
 G06K 9/34 (2006.01)
(52) U.S. Cl.
 USPC .......................... 382/103; 382/100; 382/173
(58) Field of Classification Search .................. 382/254, 382/262, 274, 275
 See application file for complete search history.

(56) References Cited

U.S. PATENT DOCUMENTS

| | | | |
|---|---|---|---|
| 4,439,940 A | 4/1984 | Deryk | |
| 4,441,165 A | 4/1984 | Coleman et al. | |
| 4,456,968 A | 6/1984 | Carter et al. | |
| 4,513,440 A | 4/1985 | Delman | |
| 4,560,974 A | 12/1985 | Coleman et al. | |
| 4,603,430 A | 7/1986 | Sacks | |
| 4,677,465 A * | 6/1987 | Alkofer | 358/506 |
| 4,739,401 A | 4/1988 | Sacks et al. | |
| 5,471,240 A | 11/1995 | Prager et al. | |
| 5,644,508 A | 7/1997 | McNary et al. | |
| 5,903,659 A * | 5/1999 | Kilgore | 382/103 |
| 6,111,975 A * | 8/2000 | Sacks et al. | 382/103 |
| 6,747,697 B1* | 6/2004 | Lin et al. | 348/246 |
| 6,792,162 B1* | 9/2004 | Edgar | 382/275 |
| 6,915,021 B2* | 7/2005 | Cannata et al. | 382/254 |
| 6,965,702 B2* | 11/2005 | Gallagher | 382/266 |
| 7,221,785 B2* | 5/2007 | Curry et al. | 382/129 |
| 7,643,676 B2* | 1/2010 | Malvar | 382/162 |
| 2002/0122354 A1 | 9/2002 | Williams et al. | |
| 2004/0173735 A1 | 9/2004 | Williams et al. | |
| 2005/0213845 A1* | 9/2005 | Avinash et al. | 382/275 |

(Continued)

FOREIGN PATENT DOCUMENTS

WO 0115085 A1 3/2001

OTHER PUBLICATIONS

European Patent Office, International Searching Authority, "Annex to Form PCT/ISA/206 Communication Relating to the Results of the Partial International Search," mailed Sep. 20, 2010; International Application No. PCT/US2010/040071, filed Jun. 25, 2010.

(Continued)

*Primary Examiner* — Claire X Wang
*Assistant Examiner* — Avinash J Yentrapati
(74) *Attorney, Agent, or Firm* — Eric A. Gifford

(57) ABSTRACT

Systems and devices for processing image or other data using non-linear methods to compensate for localized slopes are described. In one implementation, the slope of the sample values in an image or other dataset is estimated in one or more directions using a non-linear filter, such as a median filter. The values of at least some of the samples of interest are compensated using the estimated slope values to remove the effects of the slope. The compensated values may then be processed to determine if the target is present in the samples of interest, or for any other purpose.

26 Claims, 4 Drawing Sheets

U.S. PATENT DOCUMENTS

| | | | |
|---|---|---|---|
| 2006/0049974 | A1 | 3/2006 | Williams |
| 2007/0040061 | A1 | 2/2007 | Williams |
| 2008/0031629 | A1 | 2/2008 | Nguyen et al. |
| 2008/0056606 | A1 | 3/2008 | Kilgore |
| 2008/0112594 | A1 | 5/2008 | Williams et al. |
| 2008/0204731 | A1 | 8/2008 | Williams |
| 2008/0205785 | A1* | 8/2008 | Geiger et al. .................. 382/260 |
| 2009/0001214 | A1 | 1/2009 | Williams et al. |
| 2009/0046902 | A1 | 2/2009 | Williams et al. |
| 2009/0078817 | A1 | 3/2009 | Williams |
| 2009/0103776 | A1 | 4/2009 | Williams et al. |

OTHER PUBLICATIONS

Kutiyal, D. S. "SITARO (Satellite Image Target Analysis and Retrieval of Objects) for Defense Application,"Jan. 1, 2008, pp. 1-153, XP007914633; retrieved from the Internet: URL:http://www.facweb.iitkgp.ernet.in/{pabitra/facad/06CS6027t.pdf} [retrieved on Aug. 30, 2010], p. 4, section 1.2, figure 1.4.

Anonymous: "Derivative" Wikipedia, Oct. 23, 2009, pp. 1-17, XP002598674; retrieved from the Internet: URL: http://en.wikipedia,org/w/index.php?title=Derivative&oldid=321604843 [retrieved on Aug. 30, 2010], pp. 3-4, section "Definition via difference quotients".

Anonymous: "Median Filter" Wikipedia, Aug. 31, 2009, pp. 1-3, XP002598675; retrieved from the Internet: URL:http://en.wikipedia.org/w/index.php?title=Median$_{13}$ filter&oldid=311102726 [retrieved on Aug. 30, 2010], p. 1, paragraph 1, p. 1-2, section "Example".

Karaman M. et al. "New Radix-2-Based Algorithm for Fast Median Filtering" electronics Letters, IEEE Stevenage, GB, vol. 25, No. 11, May 25, 1989, p. 723/724, XP000121350; ISSN: 0013-5194, p. 724, left-hand column, paragraph 4—last paragraph.

Ataman E. et al. "A Fast Method for Real-Time Median Filtering" Transactions of the IRE Professional Group on Audio, IEEE Inc. New York, U.S., vol. 28, No. 4, Aug. 1, 1980, pp. 415-421, XP001160948, figures 1, 2, section II.

Piccardi M. Ed—Liu W. T. et al. "Background Subtraction Techniques: A Review" Systems, Man and Cybernetics, 2004 IEE International Conference on, IEEE, Piscataway, NJ, USA, vol. 4, Oct. 10, 2004, pp. 3099-3104, XP010773231; ISBN: 978-0-7803-8566-5, p. 3099, section 2.1, p. 3100, left-hand column, paragraph 2.

Elad et al. "Low Bit-Rate Compression of Facial Images" IEEE Transactions on Image Processing, vol. 16, No. 9, Sep. 1, 2007, pp. 2379-2383, XP007914649; retrieved from the Internet: URL:http://ieeexplore.ieee.org/xpls/ abs_all.jsp?arnumber=4286990&tag=1 [retrieved on Aug. 31, 2010], p. 3780, section A, par. 2 "linear background model".

* cited by examiner

METHODS AND SYSTEMS FOR PROCESSING DATA USING NON-LINEAR SLOPE COMPENSATION

GOVERNMENT RIGHTS

This invention was made with United States Government support under Contract Number HQ0147-09-D-0001 with the Department of Defense. The United States Government has certain rights in this invention.

TECHNICAL FIELD

The following discussion generally relates to data processing techniques and systems. More particularly, the following discussion relates to digital processing techniques that may be used to identify targets in image or other data, to enhance images, and/or to otherwise process data contained within an image or other dataset.

BACKGROUND

Many different filtering and other processing techniques have been used to identify targets in photographs or other forms of digital data. Such techniques have been widely deployed in commercial, military, industrial and other settings. In a military setting, for example, digital imagery can be processed to identify the presence of patterns, objects of interest and/or other actual or potential targets represented within a digital dataset. Image processing techniques can allow for early detection of targets that might otherwise be difficult to detect visually. Target recognition techniques may also be used in other commercial or military settings, including aerospace and maritime environments (including underwater object detection), as well as in manufacturing and other industrial settings, commercial and personal photography, and in many other settings as well.

Generally speaking, it is desirable that target detection techniques be effective at identifying objects, be relatively fast, and be computationally efficient. In some applications, detecting targets can be a significant challenge due to the presence of gradients in the background imagery and/or the presence of multiple targets within a relatively close space. Gradients in a background, for example, can create significant contrast across even small portions of an image or other dataset that can complicate target detection, particularly when such contrasts are on the same order of magnitude as the target contrast and/or when the gradients change rapidly over time.

Sloping contrasts can often be managed using conventional linear filters (e.g., averaging filters). Averaging filters, however, are highly susceptible to erroneous results when other objects are present within the processed imagery. If a target is detected by virtue of being bright relative to the background imagery, for example, the presence of additional bright objects in the processed imagery will create undesired bias in an averaging filter. That is, abnormally high or low values resulting from additional targets or other clutter can have a disproportionate effect on an average filter, thereby skewing the output of the filter away from the desired result.

Certain types of non-linear filters (e.g., median filters that simply identify the center rank order of the filtered values) can reduce the effects of outlying data values due to the nature of the median function. Due to the nature of the median function, median filters can be effective in reducing the effects of high or low magnitude noise. Conventional median filters, however, can have greater sensitivity to certain variations in the data, such as sloping backgrounds, than some other types of filters.

Both mean and median-based functions can be supplemented with various data compensation techniques to improve results, but such techniques have traditionally been computationally demanding, thereby limiting their usefulness in real time (or near real time) applications, or in applications that may have limited availability of computing resources.

It is therefore desirable to create data processing systems and techniques that are effective, yet computationally manageable. It is further desirable for such systems and techniques to reliably identify targets even in datasets with sloping backgrounds and/or with clutter from other targets is present within the processed data. These and other desirable features and characteristics will become apparent from the subsequent detailed description and the appended claims, taken in conjunction with the accompanying drawings and this background section.

BRIEF DESCRIPTION

Various systems, devices and methods for processing image or other sample data using non-linear rank order filters are described. In one implementation, an image or other dataset has a number of samples (e.g., pixels) each having an associated intensity, luminance, magnitude and/or other sample value. The slopes of the sample values are estimated in one or more directions using non-linear filters, such as median or other rank order filters. The values of at least some of the samples of interest are compensated using the estimated slope values to remove the effects of any sloping background imagery or other values. The compensated values may then be processed to determine if the target is present in the samples of interest.

Some embodiments provide methods implementable by a computer, programmed logic array and/or other digital processing logic for automatically identifying a target in an image having a plurality of pixels, each pixel being associated with a pixel value. In this example, the method comprises selecting a subset of the plurality of pixels in the image, determining, using a first rank order filter, a first slope of the pixel values in a first direction of the image based upon the pixel values of at least some of the pixels in the subset, determining, using a second rank order filter, a second slope of the pixel values in a second direction of the image based upon the pixel values of the at least some of the pixels in the subset, compensating the values of at least some of the plurality of pixels in the digital processing logic using the first and the second slopes to create a plurality of compensated values, processing the compensated values by the digital processing logic to determine if the target is present in the at least some of the plurality of pixels, and providing an output from the digital processing logic that indicates if the target is present.

In another exemplary embodiment, a method that is executable by a digital computer, programmed logic array and/or other digital processing logic automatically identifies a target in a dataset having a plurality of samples, each sample being associated with a sample value. This exemplary method suitably comprises determining, with a rank order filter, a first slope based upon the sample values of at least some of the samples in the dataset, compensating the sample values of at least some of the plurality of samples in the digital processing logic using the first slope to create a plurality of compensated values, and determining if the target is present in the at least some of the plurality of samples by processing the compensated values with the digital processing logic.

Still other embodiments relate to systems for processing data comprising a plurality of samples each having a sample value. An exemplary system comprises an acquisition module configured to receive at least one dataset comprising the data, a processing module, and an output module. The processing module comprising first and second rank order filters is configured to determine a first slope in a first direction of the dataset based upon the sample values of at least some of the samples in the dataset using the first rank order filter, to determine a second slope in a second direction of the dataset based upon the values of the at least some of the samples in the image using the second rank order filter, to compensate the values of at least some of the plurality of samples using the first and the second slopes to create a plurality of compensated values, and to determine based on the compensated values if the target is present in the at least some of the samples. The output module is configured to provide an output that indicates if the target is present.

The various implementations may be enhanced or modified in many different ways to create any number of alternate embodiments. Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a diagram of an exemplary system for processing image data;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various embodiments providing systems and techniques for removing linearly planar backgrounds in images or other datasets to enhance the detection of objects, patterns or other targets. Such techniques may be useful, for example, in identifying targets even in relatively low signal-to-noise ratio (SNR) datasets, including images that contain gradient backgrounds and/or that have other objects of detectable size and magnitude nearby. Generally speaking, slope components in one or more different directions are estimated using non-linear (e.g., median or other rank order) filtering techniques to reduce sensitivity to other objects within the measurement window. The component slopes may be used to compensate the observed sample values using linear superposition. By compensating the values of certain samples of interest for the effects of the measured slope(s), a suitable zero-base for threshold detection can be provided, and/or other beneficial results can be achieved. These and other concepts are described in increasing detail herein.

The various systems and techniques described herein may find use in any number of settings. For convenience, the following discussion may emphasize target recognition and image processing applications, such as those used in identifying objects in military settings. Equivalent systems and techniques, however, may be applied in any military, commercial, industrial, personal or other setting that uses object recognition, image enhancement, background smoothing or other processing. Moreover, the particular parameters described herein (e.g., mathematical values, values of constants, sizes and shapes of pixel windows, and/or the like) are purely exemplary. Other implementations and embodiments may use any number of different but equivalent values, algorithms and/or other parameters as desired.

Figure 1:
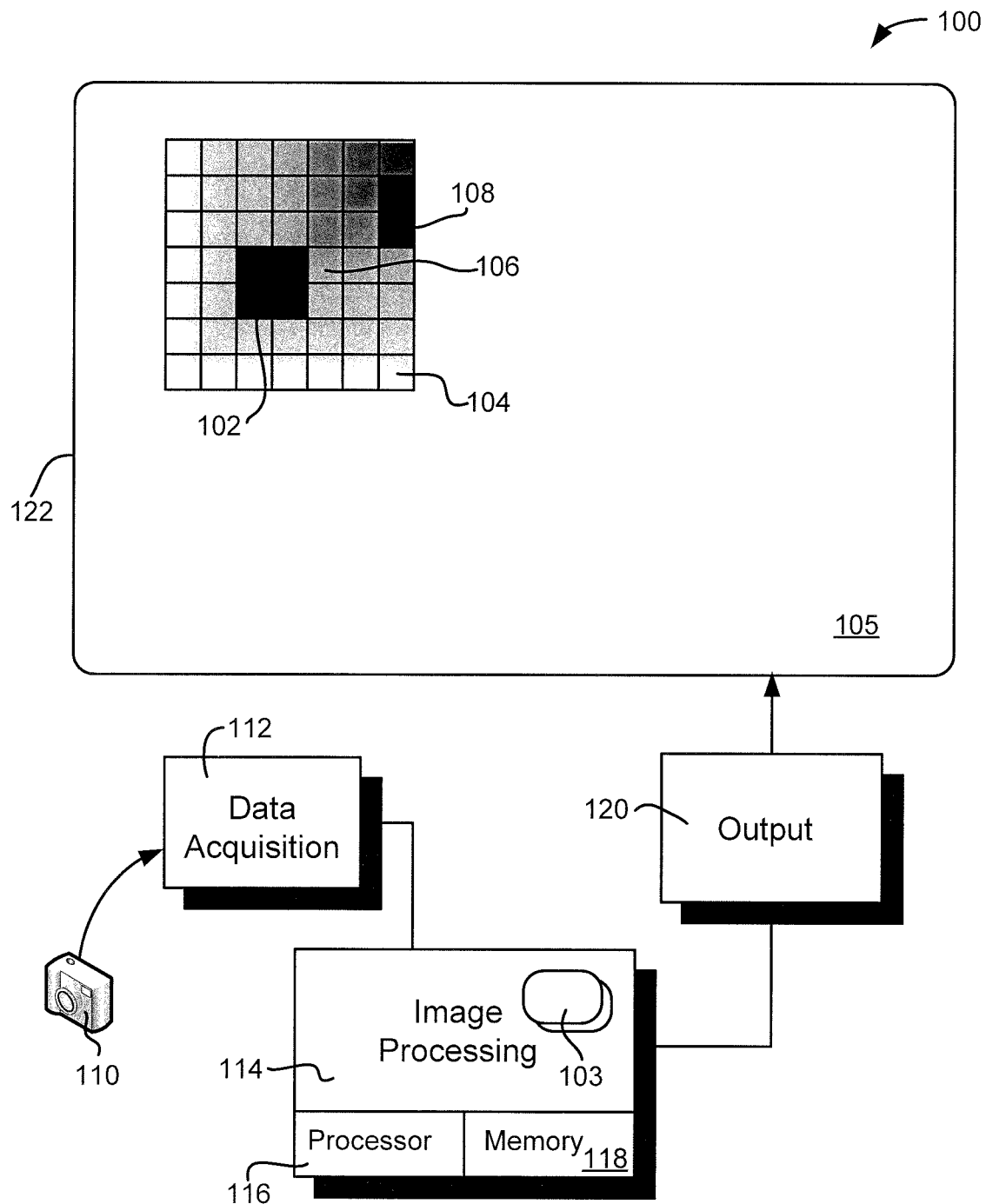

Turning to the drawing figures and with reference now to FIG. 1, an exemplary system 100 for processing data 103 suitably includes an acquisition module 112, a processing module 114, and an output module 120. In the particular example illustrated in FIG. 1, datasets 103 represent pixel values associated with digital images, such as an image 105 that can be presented on a display 122 or elsewhere. Equivalent embodiments, however, could be formulated that use any sort of data collection, processing and/or output features that are appropriate to different types of sampled data other than digital imagery. The various systems and techniques described herein could be equivalently used to process samples of time series data (e.g., communications, radar, or other radio frequency (RF) signals), which may be gathered and processed in any manner.

Processing module 114 is any hardware, software, firmware and/or combination thereof that is capable of processing data as described herein. In various embodiments, processing module 114 is implemented in software or firmware that can be stored in any conventional memory 118 or mass storage, and that can be executed on any conventional processor 116. To that end, processing module 114 may be implemented in this example using a personal computer, workstation or the like based upon general purpose computing hardware that executes software in any format. In other embodiments, processing module 114 is implemented in a special-purpose computer using specially-designed processing, data storage and/or other circuitry, such as any sort of hardware designed for deployment in aerospace, maritime, battlefield or other demanding environments. In various embodiments, certain features of processing module 114 are partially or entirely implemented using programmable logic devices such as any sort of field programmable gate array (FPGA) or other configurable gate array (CGA), application specific integrated circuit (ASIC), programmed array logic (PAL), and/or the like. Any number of equivalent embodiments may be designed and implemented using any sort of hardware, software, firmware and/or other digital processing logic as desired.

Data acquisition module 112 is any hardware, software or combination thereof capable of receiving data from any source and of providing the received data to image processing module 114. In various embodiments, acquisition module 112 receives digital or analog imagery from a camera 110 or other source; equivalent embodiments may receive data from any source, such as any sort of RF receiver, data collection system, and/or the like. In other embodiments, data acquisition module 112 simply represents input logic that allows datasets 103 to be manually or automatically uploaded or otherwise provided to processing module 114 from another computer system or other source. Module 112 may also perform any analog-to-digital conversion, format conversion or other manipulation that is useful in placing received data into a format that is useable by processing module 114. In various embodiments, acquisition module 112 is a software process or routine residing in the same memory 118 and/or executing on the same processor 116 as processing module 114, although other embodiments may separate the data acquisition and processing functions between two or more different processors or computing systems.

Output module 120 is any hardware, software or combination thereof that is capable of providing any output from processing module 114. Output module 120 may be implemented, for example, using software or firmware instructions residing within memory 118 or mass storage and executed on the same processor 116 as processing module 114. Alternatively, output module 120 may be implemented on separate hardware (e.g., on a separate computing system) from image processing module 114.

In various embodiments (such as the example shown in FIG. 1), output module 120 may be a display generator that is capable of rendering imagery 105 on any sort of display 122. Such imagery 105 may be presented to a pilot, soldier, driver, operator and/or other viewer for identification of objects 102 contained within the imagery 105. As described more fully below, various embodiments may enhance the imagery 105 so that objects 102 are more readily visible to the viewer. Other embodiments may automatically detect and highlight objects 102 by boldfacing object 102 in image 105, by placing an indicator near the object 102, and/or the like. Still other embodiments of output module 120 may provide audible, tactile and/or other indications that objects 102 are detected within the imagery 105, without necessarily rendering imagery 105 on a display 122. Still other embodiments of output module 120 may simply transmit information about a detected object 102 to another computer process or system, or may take any other action as desired.

In some embodiments, image 105 represents a special image that is used for the detection of objects, patterns and/or any other targets 102. Such an image 105 may be formatted in some embodiments as a conventional digital photographic image; in other embodiments, image 105 may additionally or alternately capture radiation in the infrared, ultraviolet or other non-visible spectra. In a conventional target detection system, for example, images 105 may be made up of any number of monochrome-type pixels each representing the intensity of detected infrared, visible, ultraviolet and/or other radiation in a particular portion of the image. Because many potential targets tend to radiate heat energy that is detectable in the infrared spectrum, infrared images may be highly indicative of such targets. In such images, pixels that correspond to detectable objects will typically have greater intensity values than the surrounding pixels, provided that the target signal can be extracted from the background noise of the image, and provided that the target signal can be separated from any other target images or other clutter that may be present in the image.

Datasets 103 are any groupings or collections of sample data that can be processed within system 100. In some embodiments, datasets 103 represent image data, such as any other data used to generate image 105. In an exemplary image processing embodiment, dataset(s) 103 may be generated from one or more bitmap-type or other digital images that represent imagery with any number of pixels. Pixels, in this sense, are discrete component samples of an image or picture that can be characterized by any number of attribute values. In a conventional monochrome image, for example, each pixel may be represented by a luminance value that represents the intensity of light in that portion of the image. Color images may have pixels that are described by luminance values, as well as a chroma value that represents the color of the pixel. Pixels of monochrome and color images may be represented in any other manner to create images in any format. Although many embodiments will process data sets 103 that represent pixel luminance or other qualities, other embodiments may process other types of data in addition to or in place of image pixel values. Data contained in one or more acquired datasets 103 may be processed as appropriate for any purpose. To provide just a few examples, data in datasets 103 may be processed to enhance a displayed image 105, to identify objects or other targets 102 represented within the data, and/or to perform other tasks as desired.

While imagery 105 may be generated directly from one or more datasets 103 in some embodiments, this dataset 103 need not represent a literal, renderable image in all embodiments. To the contrary, datasets 103 may represent any collection of sample data that can be processed to identify targets or to perform other tasks as desired. To that end, dataset(s) 103 used in processing need not be used to generate imagery 105; alternate (but equivalent) datasets 103 may contain any number of sample values representing data of any sort, such as RF signals, measurements of any environmental or industrial condition (e.g., temperature, pressure, humidity, or other conditions), time series data and/or any other type of data as desired. Further, data processing in some embodiments may be performed on multiple datasets 103 in any manner. Data samples from separate datasets 103 may be inter-combined, for example, as desired.

Data sets 103 may be processed in some embodiments to identify the presence of actual or potential targets 102 within the data. Such "targets" may represent actual or potential objects of interest, patterns, and/or any other target to be detected within the dataset 103. In some embodiments, targets 102 are generally identified by detecting unusually bright pixel intensities in an infrared or visible image.

In an exemplary embodiment, targets 104 are identified by considering any number of "windows" 104, or subsets of the values in the data set 103. For example, window 104 may refer to data values in data set 103 that represent a contiguous or other portion of pixel values in image 105. The particular size of each window 104 will vary from embodiment to embodiment. In general, it is desirable that the window 104 be sized to accommodate the size of any target objects 102 across the desired detectable range. In various embodiments, processing module 114 seeks to determine if a target 102 is present within an area 106 of the window 104. In such embodiments, it may be desirable to design the window 104 so that it is at least twice as large (or so) as the detectable area 106, which in turn should be designed to encompass enough data samples to detect the target object 102 at an appropriate range.

In the exemplary embodiment shown in FIG. 1, image 105 has a current window of interest 104 that encompasses a 7×7 grid of pixels, for a total of forty-nine potential pixels of interest, with the center-most nine pixels identified as the detectable area 106. In this example, then, it would be desired to identify whether a target 102 is present within area 106 by considering the values of those pixels contained within window 104. The particular size of window 104 and/or area 106 may be upwardly or downwardly adjusted in other embodiments, as desired; similarly, the shape of window 104 and/or area 106 may be adjusted (e.g., to a rectangular, round, or other shape as desired). As noted above, equivalent windows 104 and areas 106 may be readily formed and applied to other types of data other than image pixels, as desired.

FIG. 1 also shows that the sample values within window 104 exhibit a sloping gradient across both horizontal and vertical directions. That is, the pixel intensities shown in image 105 as illustrated in FIG. 1 in tend to increase from bottom to top and from left to right in this example. FIG. 1 shows a target 102 that is present within area 106; FIG. 1 also shows a "clutter point" 108 in the form of other bright pixels within window 104. As noted above, the sloping background across window 104 could be at least partially compensated by determining a mean value of the pixel intensities, and then subtracting this mean value from the center pixel(s). This computation, however, would be skewed if target 102 and/or clutter point 108 were included in the computation of the mean. Since both target 102 and clutter point 108 have substantially larger intensities than the other cells, these large values would tend to unduly bias the mean intensity to be significantly higher than the mean intensity of the background imagery. If a rank order (e.g., median) intensity were instead determined, a result closer to the central value of the intensity would be more likely to result, since significantly outlying values (e.g., the intensity values resulting from target 102 and/or clutter point 108) would only slightly affect the rank order of the value. The rank order filter, however, is less likely to accurately predict the actual amount of background noise that is present, since conventional rank order functions simply select the desired rank order (e.g., the number that separates the upper half of the sample values from the lower half of the sample values in a conventional median) without regard to spatially changing biases in the noise distribution. Hence, the results of a simple median filter applied to the pixel intensity values would not, typically, provide an accurate enough estimation of the sloping background in some applications.

Figure 2:
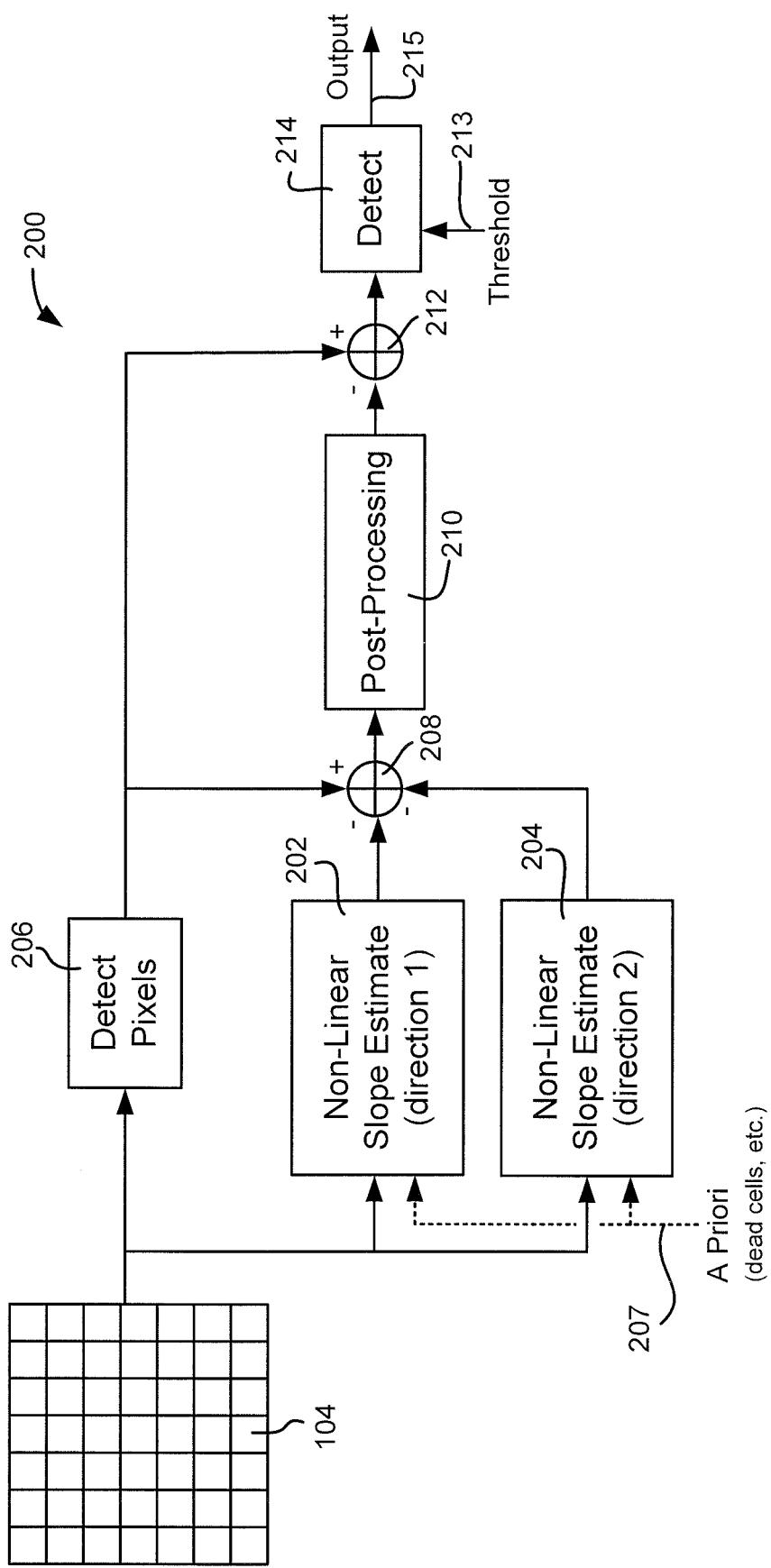
FIG. 2 is a conceptual diagram of an exemplary system for detecting targets in image data.

Referring now to FIG. 2, a much more accurate estimation of sloping backgrounds can be obtained by estimating the slope in one or more different directions (e.g., horizontal and vertical directions), and then superimposing the corrections for these estimations upon the actual intensity values that are obtained from data set 103. Moreover, the slope can be very accurately estimated using non-linear filtering techniques, such as median or other rank-order filters, as described more fully below. The general functions shown in FIG. 2 may be implemented in any sort of digital processing logic, such as any sort of hardware, software, firmware or combination thereof. Some or all of system 200 may be implemented, for example, using software executing on any processing or computing platform, using configurable gate arrays or similar programmable logic, using one or more ASICs, using any combination of these techniques, and/or in any other manner.

In one embodiment, an exemplary system 200 for processing image data suitably includes modules for selecting the subset 104 of pixels in the image 105, estimating the slopes of the pixel values within the sub-set using non-linear filters in a first direction (filter 202) and/or in a second direction (filter 204), and compensating at least some of the pixels of interest 206 using the estimated slope values (e.g., by adder 208). The compensated pixel values may be processed to determine if the target 102 is present in the pixels of interest (detector 214), as desired. Each of the functions and modules shown in FIG. 2 may be combined, supplemented or otherwise modified from the example shown.

FIG. 2 shows an exemplary embodiment in which background slope is estimated in two different directions using filters 202 and 204. In some implementations, different numbers of filters may be applied. If the direction of slope is known a priori, for example, a single slope filter (e.g., filter 202) applied in the direction of the slope may be sufficient. Similarly, certain types of data in datasets 103 may be single dimensional and/or may be otherwise appropriate for a single filter. Conversely, third, fourth and/or other additional filter(s) may be applied in other implementations for redundancy, to accommodate additional dimensions in captured data, and/or for any other purpose. Moreover, a single filter 202 may be sequentially applied any number of times (e.g., data could be serially applied to a single filter 202 multiple times to obtain equivalent results to the multiple-filter embodiment shown in FIG. 1). Equivalent embodiments may therefore have any number of filters 202, 204 that are used in any manner, as desired.

As shown in FIG. 2, non-linear filters 202, 204 are applied to decompose the sloping values of window 104 into estimated scale factor coefficients that can be cumulatively applied, using linear techniques, to compensate for the effects of the sloping background imagery. Non-linear filters 202, 204 each estimate the slope of the pixel values in a different direction; in various embodiments, one filter 202 may estimate the pixel values in a horizontal direction, for example, while filter 204 estimates the slope in a vertical direction. Other embodiments may use alternate diagonals of the dataset, and/or any other coordinate systems and parameters. Generally speaking, considering the slope in two or more directions will provide more accurate results for slopes that are not parallel to any of the directions considered. For that reason, it may be desirable in many embodiments for the filters 202, 204 to be applied in orthogonal (or nearly orthogonal) directions, although other embodiments could use any different parameters or settings, or may compensate for non-orthogonality with redundancy or other types of additional processing.

As noted above, non-linear filters 202, 204 may implement median-type or other rank order filtering that identifies a desired value based upon a position in an ordered listing. Examples of rank-order filters could include median functions, although equivalent embodiments could seek out non-central ranks or combinations of ranks (e.g., means or other combinations of two or more ranked values) that may not precisely correspond to the classical definition of a "median". Rank order filters can be very effective in reducing the effects of high magnitude clutter (e.g., the effects of clutter point 108 in FIG. 1). And, as noted below, the particular values used to in the rank order filter can be pre-processed to improve the accuracy and reliability of the result.

Filters 202 and 204 may each be any sort of rank order or other non-linear filter, including any sort of filter based upon the median function. Examples of "rank order filters" could include, without limitation, any sort of traditional ordered rank filter, including any sort of median, weighted median and/or other median-based function as desired, as well as any sort of hybrid filter that incorporates a mean-based function in combination with rank order processing. A hybrid filter that linearly averages a certain range of the rank-ordered samples, for example, may be useful in some embodiments. The "range" used in such a hybrid filter may encompass a central portion of the ranked values as defined by a pre-determined portion (e.g., 25-50% or so), a statistically significant portion (e.g., values within 1-3 standard deviations of a median/mean value), two or more particular ranks (e.g., central two ranks, particularly when an even number of values are considered), and/or any other range as desired; other ranges may have other values, or may be determined in any other manner. Such a hybrid filter may be useful, for example, when the input noise is not significantly larger than the least significant bit of the input samples and/or when quantization noise is relatively significant. Many different types of median filters may be used in any number of equivalent embodiments.

Filters 202 and 204 need not be identical filters. In some implementations, filters 202 and 204 are similar filters that simply accommodate values in two different directions. Indeed, the same hardware or other processing logic may be used in some embodiments to implement filters 202 and 204 to conserve hardware resources, or for any other reason. Other embodiments, however, will use different sets of processing logic to implement the multiple filters 202, 204 to facilitate parallel processing of the median slopes 203 and 205, particularly when processing speed is of concern. It is not required, however, that the various filters be identical, and certain implementations may use slightly (or significantly) differing filters 202, 204 in the different directions, as desired. Filters 202, 204 may be implemented in any sort of hardware or processing logic; in some embodiments, filters 202 and/or 204 are implemented on common or separate configurable gate arrays in communication with digital processing hardware and/or software that implements the other features of processing module 114, as desired.

FIG. 2 shows filters 202, 204 as ignoring the effects of malfunctioning pixels and/or any other undesired sample values that may be excluded for any other reason. In image processing applications, such undesired values may include, for example, values representing "dead pixels", "blinkers", pixels with undesirably high noise levels and/or other pixels that are not performing as desired. Other undesired values that may be excluded from compensation and/or filtering could include center values (which may contain target imagery), corner values or other values on the periphery of window 104, and/or any other values in window 104 as desired. FIG. 2 shows these undesired values as being identified in a mask 207 that is provided to the filters 202, 204, although in equivalent embodiments such values may additionally or alternatively be excluded in any other manner, such as in post-processing 210. Additional detail about value exclusion is provided in conjunction with FIG. 3 below.

The estimated slope values 203, 205 that are output from the filters 202, 204 (respectively) may be used to compensate some or all of the sample values in window 104 in any manner. In some embodiments, this compensation may be performed by linearly superimposing the estimated slope value(s) 203, 205 upon the sample values of interest. In the embodiment shown in FIG. 2, for example, the two estimated slopes 203, 205 are simply subtracted from the values of the samples of interest, as noted by summing junction 208. As shown in FIG. 2, the estimated slopes 203, 205 may be subtracted from some or all of the sample values associated with data samples in window 104. In some implementations, only the values 206 associated with the detect area 106 are used in the detect function 214, so only these values need to be fully compensated; other embodiments may compensate the other values in window 104 as well for improved image clarity or for any other purpose.

FIG. 2 shows a post-processing feature 210 that may be provided in some embodiments. Post-processing may involve, for example, applying additional linear and/or non-linear filters, or performing any additional processing that may be desired. In some embodiments, post-processing 210 may involve identifying noise biases or other contaminated samples from the processed data. If a clutter object 108 or other noise bias is identified in the processed data, for example, the bias can be corrected in any manner. Results may be corrected through any sort of detection and compensation (as indicated by summing junction 212 in FIG. 2), for example, or by repeating the filtering performed by filters 202, 204 (or similar fillers) with any biased sample values excluded. Further, samples adjacent to any excluded samples may be excluded, as desired, to reduce any residual effects of the clutter that may be difficult to detect using threshold filtering or the like. Biased values may be excluded using mask 207, or in any other manner.

Other types of post-processing 210 could include further processing to evaluate any background noise (e.g., the DC noise remaining after the sloping effects are removed) of sample window 114. After the sloping effects are removed (e.g., by compensation 208), the compensated sample values may be processed as desired to determine a mean, mode, rank order (e.g., median), hybrid mean/median or other estimation of the compensated values; this estimate, in turn, could represent an estimate of the background noise present in window 114 after any local sloping effects are removed. One example of a technique that could be used to determine a rank order value is described below in connection with FIG. 4, although other embodiments may use other rank order or other filters as desired. In various embodiments, one or more of the same filter(s) used in filters 202, 204 could be used to determine a filtered background estimate, although other embodiments may use separate logic or completely different filters. The filtered estimate of the background noise, in turn, may be used for any purpose, such as to improve the resolution of image 105, to improve target detection, and/or the like. In an exemplary embodiment, the estimated/filtered background value may be subtracted 212 from some or all of the compensated sample values to further improve the effects of threshold filtering or other target detection techniques, as desired.

Other types of post-processing could include, in some embodiments, estimating sample values around the edges (or other appropriate regions) of window 114. Although many conventional spatial filters are known to lose boundary samples during processing, the estimate(s) of the sloping background and/or background noise level can be used to estimate background values that can be used to fill in values for edge and/or corner pixels in images, or other sample values as desired. Many other types of post-processing may be performed in any number of alternate embodiments; still other embodiments may partially or entirely exclude post-processing as shown in FIG. 2.

In embodiments that automatically detect the presence of target 102 in detect area 106, a further processing function 214 may perform such detection. Since the effects of any background gradients have already been removed from the compensated values received at function 214, target detection may simply involve comparing the compensated values to an appropriate threshold value 213. That is, if the value of interest maintains a sufficiently high intensity after the effects of the background gradients have been removed, then the value is likely to represent a target 102. An appropriate output 215 may be provided to indicate the presence and/or absence of a target 102 as desired; appropriate outputs may include signals that generate visual, audible and/or tactile feedback, as desired. Other embodiments may simply provide an electronic notification to another processing routine or module (e.g., output module 120 in FIG. 1) to allow the other module to process the result. As noted above, other embodiments may simply use the information processed in system 200 to enhance an output image 105 for improved emphasis of targets 102 or otherwise improved viewing, without necessarily automatically detecting or highlighting targets within the imagery or other data.

Figure 3:
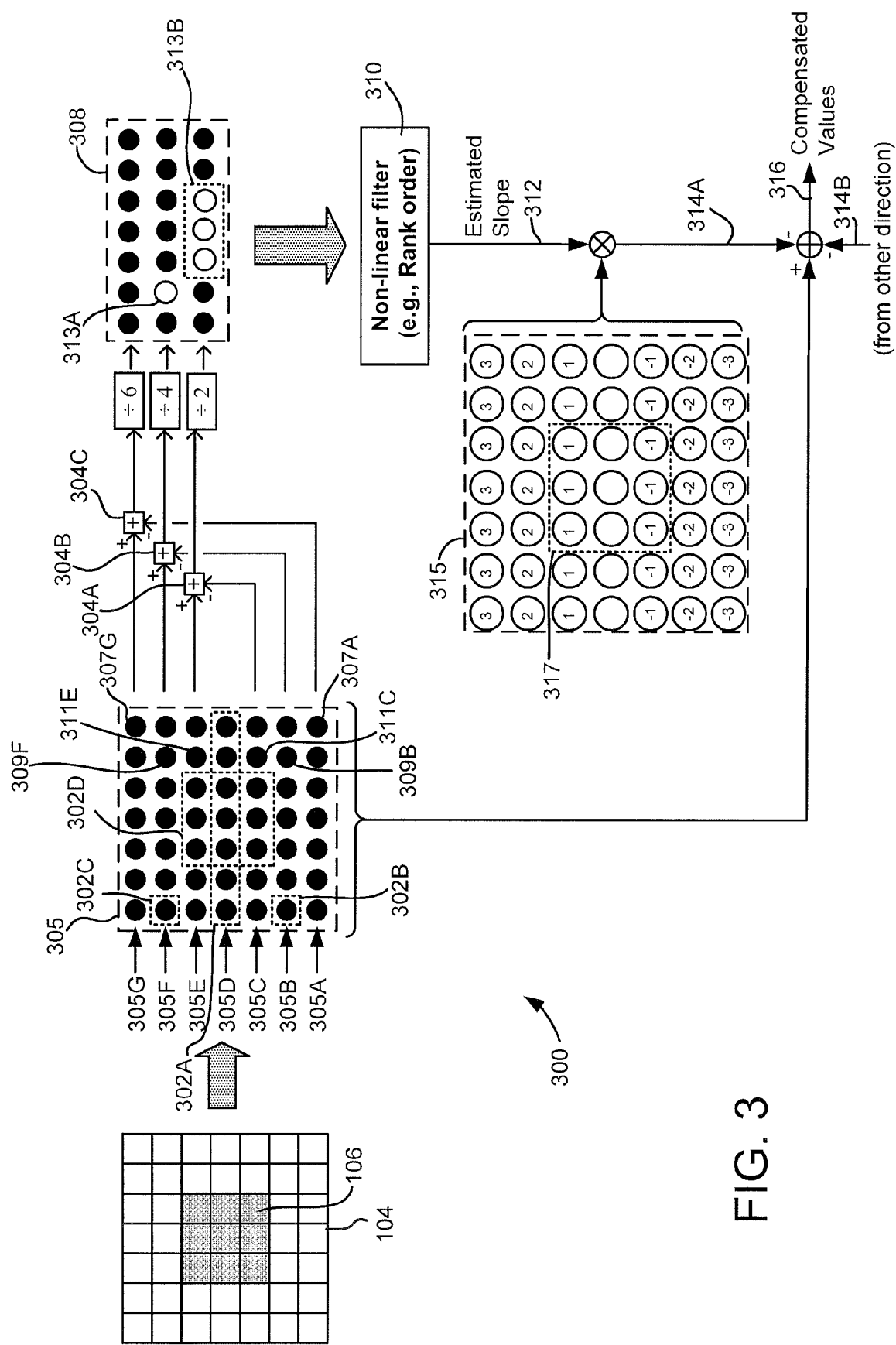
FIG. 3 is a block diagram of an exemplary process for non-linearly filtering image data and compensating the image data based upon the results of the non-linear filter.

FIG. 3 shows one exemplary implementation of the filtering and compensating functions that are introduced in FIG. 2. The example shown in FIG. 3 illustrates a technique for estimating the slope in the vertical direction of a 7×7 window 104. This feature could be used to implement a rank order filter such as either of filters 202 and/or 204 above. The concepts introduced in FIG. 3, however, would be equally applicable to windows 104 of different shapes or dimensions, and would apply equally well in the horizontal direction (e.g., to the other filter 202/204 in FIG. 2). The filtering techniques shown in FIG. 3 could be equivalently applied to other types of data in addition to pixel data, as noted above.

As shown in FIG. 3, the various pixels (or other samples) in window 104 each have associated values 305 that are shown logically arranged into rows 305A-G. (Embodiments that process slope in the horizontal direction would simply consider the columns of values 305 instead of the rows, similar to conceptually rotating values 305 by ninety degrees.) Each row 305A-G in FIG. 3 contains values associated with a row of samples in window 104. These values may be pre-processed and filtered in any appropriate manner to estimate the slope of the values from one side of window 104 to another. In this example, the slope is generally considered to be positive if the intensity increases from row 305A toward row 305G. Other embodiments may use other sign conventions, as desired, with equivalent results.

Certain values 305 may be excluded, as desired. For example, values in the central row 305D may be excluded to create an even number of rows 305A-G for subsequent processing, and/or to exclude values from the detection area 106 of window 104. Other values within area 302D may be similarly excluded, as desired, to avoid considering samples from the detection area 106, which may contain unusually high intensities if the target 102 is present. Any other values may be further excluded, including any values corresponding to malfunctioning samples. If a pixel corresponding to value 302B, for example, is known to be "blinking", "stuck", "dead" or otherwise malfunctioning, it may be desirable to exclude the value 302B from further analysis. In some embodiments, a mask 302 may be applied to indicate certain value locations that are to be excluded; this mask 302 may include any pixels or other samples excluded due to malfunction (e.g., value 302B in the above example), any values excluded due to policy or algorithmic considerations (e.g., values 302A and/or 302D), and/or any other values to be excluded as desired. Further, because of the symmetry that may be applied in some embodiments (and that is described more fully below), it may be desirable to exclude other values that would otherwise be processed in conjunction with malfunctioning or otherwise excluded samples. It may be desirable, for example, to also exclude value 302C if value 302B is excluded for any reason; this maintains an even number of values, and maintains adequate weighting for the various sample values that are calculated below. Other embodiments may exclude values from corner samples, samples that are known to correspond to clutter or other undesirable values, as well as any sample values that would otherwise be paired with the excluded samples using the following analysis.

Masked or otherwise excluded samples may be processed in any manner. In some embodiments, malfunctioning or otherwise excluded samples can be identified in the processing logic using a bit or other flag that indicates that the sample is appropriate or not appropriate for further processing. Alternately, a label (e.g., "Not a Number (NAN)") or other identifier could be provided that inhibits subsequent processing using that sample value; this would have the effect of automatically excluding any samples that would otherwise by processed with the excluded sample. That is, it may not be necessary to separately identify or exclude particular values such as 302C in some embodiments, if the processing logic is able to simply ignore all computations involving masked value 302B in combination with other values. Again, sample values may be excluded in any manner.

Some or all of the values 305 may be grouped or otherwise combined with other values 305 in any manner. In the example of FIG. 3, many of the values 305 are paired with other values that are equidistant from the center of window 104 in the direction of the estimated slope. Values 307A and 307G, for example, could be paired with each other in computing the vertical slope since these values are equidistant from the center row 305D and are displaced from each other in the vertical direction. Similarly, values 309B and 309F could be paired, as could values 311C and 311E. Pairing according to this example may take place in any logical manner; in the embodiment of FIG. 3, the values are paired by simply computing a difference in the two displaced values to determine the change in the value across the displaced portion of window 104. Difference block 304A, for example, reflects that values in row 305C can be compared to values in row 305E. Difference block 306B similarly reflects a comparison of the values in row 305B with values in row 305F, and block 306C reflects a comparison of the values in row 305A with values in row 305G. Each pixel value 305 that is to be analyzed is therefore paired with another pixel value 305 associated with a corresponding displaced pixel in window 104 in this example.

Other embodiments may group the sample values in any other manner different from the exemplary technique described above. More than two sample values may be combined, for example, in some embodiments. Moreover, the particular sample values selected and combined may be chosen in any manner. Rather than selecting pairs of samples that are equidistant from a centerline, for example, other embodiments may combine staggered sample values that maintain a consistent distance between samples. A row 305A value could be processed with a row 305E value, for example, while a row 305B value is processed with a row 305F value and a row 305C value is processed with a row 305G value. This scheme would maintain a consistent distance between samples, thereby potentially reducing the need for subsequent normalization. Other schemes may use overlapping (or non-overlapping) groupings to encompass any combine any number of sample values. Such groupings may be further compared with other groupings, or otherwise processed as desired. Although the offset pixels shown in FIG. 3 are aligned with each other, different embodiments may consider groupings of staggered values or values that are otherwise displaced in the direction of interest, but that might not be precisely aligned with each other. Moreover, it is not necessary that all of the samples within window 114 be processed, or that a given sample be counted in only one estimate of the slope in a given direction. Many different alternate techniques for grouping any number of sample values could therefore be formulated across a wide array of equivalent embodiments.

The differences between the combined values may, in turn, be conceptually or logically scaled (e.g., using function blocks 306A-C) to adjust for the number of samples separating the compared values and thereby normalize the various computed values. Difference results from function 304C, for example, would be divided by six in this example to reflect the six sample distance between rows 305A and 305G. Results from function 304B would be divided by four to reflect the four-sample distance between rows 305B and 305F, and results from function 304A would be divided by two to reflect the two sample distance between rows 305C and 305E. The resulting scaled values 308 therefore reflect various measurements of a change in the sample value that are normalized on a per sample basis, and therefore represent the average slope per sample in the direction of interest. For datasets that represent image data, for example, scaled values 308 may each represent an average change in the intensity per pixel in the direction of interest. As described more fully below, these normalized values may be compared to each other, may be filtered, and/or may be otherwise processed as desired. Further, in some implementations, scaling or other normalizing may not be needed. If sample values are compared (or otherwise processed with) other sample values that are staggered so that all of the processed values reflect equivalent distances, for example, then further normalization may not be needed.

The actual computations used in a practical embodiment may differ from those shown in FIG. 3. For example, it may be easier in practice to scale the difference values to a common multiple (e.g., 12 or 24 in the example of FIG. 3) so that each of the resulting scaled values can be divided by the same value. To that end, "scaling" the difference values in functions 304A-C could be equivalently performed by multiplying the differences between rows 305C and 305E by twelve, the differences between rows 305B and 305F by six, and the differences between rows 305A and 305G by four, and then dividing each of the results obtained by the common value of twenty-four. In practice, this may be much easier to implement in digital logic (e.g., CGAs, ASICs or digital software) than the dividers shown in FIG. 3, and may result in more efficient computation. Hence, the logical processes shown in FIG. 3 may be altered in any number of equivalent practical implementations.

Slope estimates 308 therefore represent various samples of a slope measurement in the direction of interest. These samples may be further processed as desired. In the example of FIG. 3, estimates 308 include seventeen samples of the normalized slope, corresponding to the three sets of seven paired difference values but excluding the value 313A corresponding to broken sample 302B and the three values 313B corresponding to values 302D from the detect area 106 of window 104. In various equivalent embodiments, the mask 302 applied to values 305 may be applied instead to the processed values by simply excluding the difference values 313A, 313B and/or the like from further processing. That is, data from broken or otherwise undesired pixels may be excluded at any stage of processing.

Each of the remaining slope estimates 308 can therefore be processed using a non-linear filter 310 as appropriate. In the embodiment shown in FIG. 3, non-linear filter 310 simply extracts the rank-order (e.g., median) value 312 of the slope estimates 308. This non-linear filter 310 is suitably resistant to the effects of extreme values (e.g., values resulting from clutter points 108), since extreme values are unlikely to be present in the rank order result of the various samples obtained (that is, any extreme values will tend to be outliers that will not be included in a rank order calculation). Moreover, because the samples 308 in this example each represent values of an average slope computed based upon multiple values 305, the median value 312 obtained from the processed values 308 is likely to be much more accurate than if the filter 310 simply processed the values 305 themselves. Hence, the processing scheme 300 of FIG. 3 suitably reduces or eliminates the adverse effects of sloping backgrounds and/or clutter points 108 in window 104.

The resulting slope estimate 312 can be used to compensate for the values of samples in window 104 as desired. In the embodiment shown in FIG. 3, estimated slope can be scaled by an appropriate value 315, and the resulting scale factor 314 can be added to the value of the corresponding sample. Since the slope estimate 312 represents an average slope per sample as computed from the central row 305D in this example, values that are farther from the central row 305D would be scaled by a greater amount than values that are closer to the central row 305D. Hence, the values 315 shown in FIG. 3 multiply the slope estimate 312 by a factor that is based upon the number of samples above or below central row 305D, with a sign that indicates whether the sample is above or below row 305D. Values 315 shown in FIG. 3 are determined based upon the sign convention used in functions 304A-C (e.g., with the less vertical values subtracted from the more vertical values), although equivalent embodiments could be formulated with different scaling values and/or sign conventions, as desired.

The scaled values are not necessarily computed for all values 305; in some embodiments, scaled values may be determined solely for the values 302D that correspond to the detect area 106 of window 104. Hence, only a subset 317 of the scaling factors 315 may be needed to compute the relevant scale factors 314 in some embodiments.

The scale factors 314A for the relevant pixels of interest may be simply subtracted from the values 305 associated with the pixels, as desired. Note that multiple scale factors 314A-B (corresponding to slopes in other directions) could be added (or subtracted) together in various embodiments, using properties of superposition that are typically associated with linear filters. That is, the compensated values 316 may reflect the observed value 305, with the estimated and scaled slope subtracted out as appropriate for that particular sample. The compensated values 316 may then be used to detect the presence of a target 102, to enhance an image 105, and/or for any other purpose.

Figure 4:
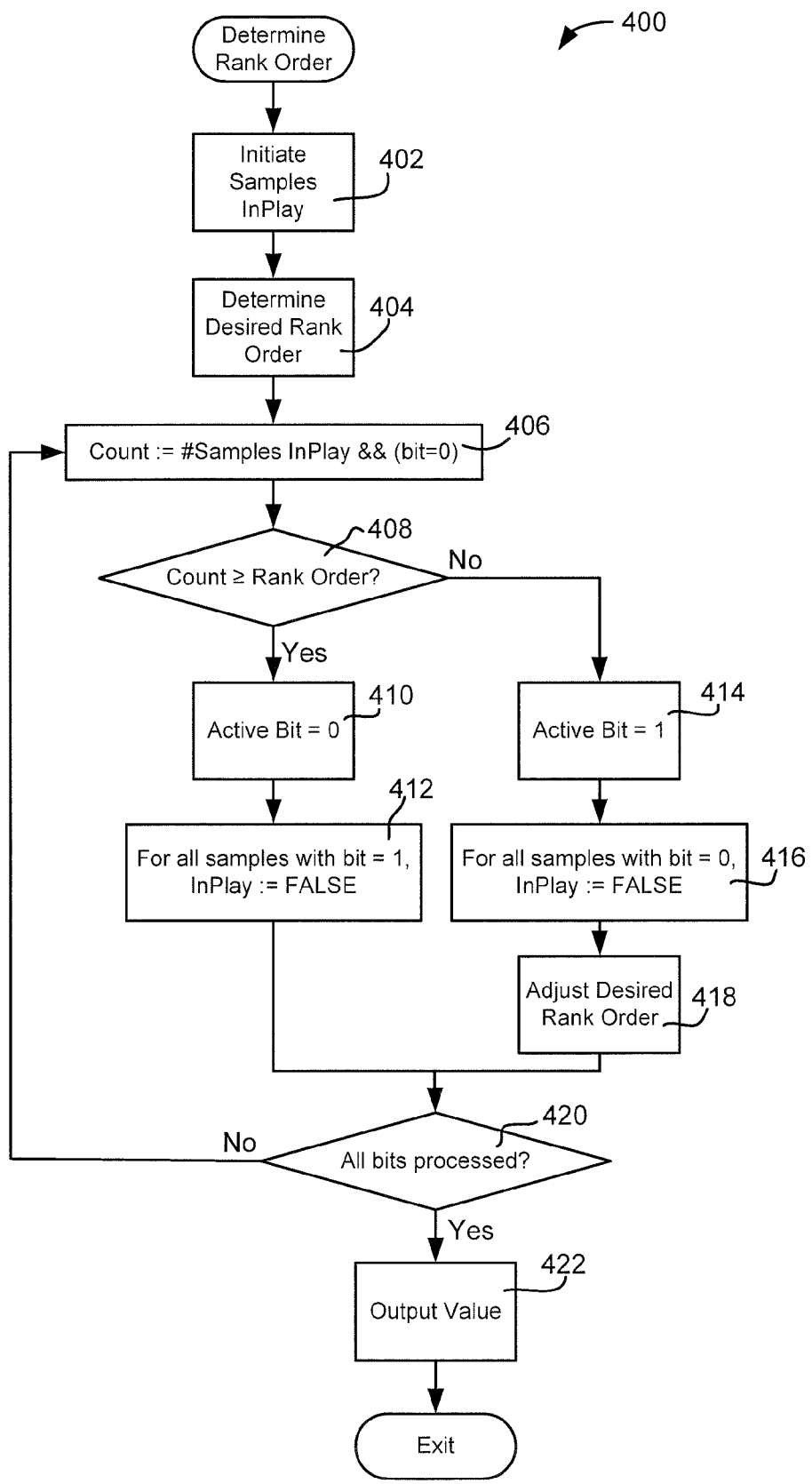
FIG. 4 is a flowchart of an exemplary process for determining median or other rank order values.

FIG. 4 shows an exemplary process 400 for determining a rank order value from an input list of data samples. Process 400 describes a technique that can be readily implemented in hardware using a very efficient number of logic gates, or that can be efficiently executed in software or firmware, as desired. Note that the particular technique 400 described in FIG. 4 is not necessarily limited to computing slope values or other results associated with filtering or image processing; to the contrary, process 400 could be used in any application in which a rank order value is desired. Conversely, while process 400 does provide a very efficient manner in which to compute slope estimates from scaled values 308 and/or values 305 (FIG. 3), other embodiments of non-linear filters 202, 204 and/or process 300 described above may be implemented using techniques other than process 400, as desired. Process 400 therefore represents one example of a technique for computing rank order values that may be used in some implementations of slope filters 202 and/or 204. Process 400 could also be used in the context of image processing to determine a median background/noise value from the compensated sample values (e.g., in post-processing 210), or for any other purpose. Other embodiments of the image processing techniques described herein may use any other technique for computing rank order values other than process 400, and process 400 may have wide application beyond the image processing and filtering techniques that are expressly described herein. Generally speaking, process 400 as illustrated in FIG. 4 may be used with sample values that are in offset form, rather than signed values. Similar techniques for processing signed or other values could be formulated in other embodiments that may differ from the example illustrated in FIG. 4.

As shown in FIG. 4, an example of a process 400 for determining one or more rank order values suitably includes the broad steps of initializing each of the samples to identify samples that are still "in play" for further processing (function 402) and identifying the desired rank order of the desired value (function 404). A bit analysis routine is then repeated (functions 406-420) for each of the bits in the samples to identify the desired sample, as described more fully below. The repeated stages 406-420 may be readily pipelined for simultaneous execution in some embodiments to create a relatively efficient hardware or software implementation. That is, various iterations of looping 406-420 may be carried out at least partially simultaneously using parallel hardware, software and/or other logic so that results can be obtained relatively quickly.

Process 400 begins by initializing certain values. Function 402, for example, initially identifies the sample values to be processed as "in play". "In play" in this sense simply reflects that the sample value has not yet been determined to be above or below the desired rank, so further processing on the sample value may be needed. In various embodiments, the "in play" samples may exclude any samples that are intentionally excluded. Samples resulting from defective pixels in window 104, for example, could be readily excluded by simply indicating that the sample values associated with the defective pixels are no longer "in play". Other values (e.g., values 313 in FIG. 3) excluded from mask 302 or the like could similarly be initially identified as "not in play" to conveniently exclude these values from further processing, as desired. Samples may be indicated as "in play" by simply setting (or clearing) a bit or other flag that is associated with the sample, as appropriate.

Initialization may also include determining the rank order of the desired value (function 404). In various embodiments, the rank order of the desired value is simply the central median value of an ordered list (e.g., the eighth sample in a seventeen-sample list), which can be readily determined by simply counting the number of samples that will be processed (ignoring, if appropriate, any values excluded from processing, e.g., any "dead pixels" or other values excluded by mask 302). This number of samples to be processed may correspond to the number of samples that are initially in play, as desired. When an even number of samples is present, the rank order of a median may be initially assumed to be the lower of the two central values (e.g., to accommodate for any upward bias created by clutter points or the like) in some implementations. Alternatively, the upper value could be used, or the two central values could be averaged or otherwise processed as desired. Any indication of the rank order that is to be sought could be used in any number of alternate embodiments. That is, process 400 is not limited to computation of median values, but rather could be used to identify any rank that may be desired. Further, process 400 may be used to simultaneously identify multiple rank values, with each desired rank having an associated set of "in play" flags and associated rank order registers.

Functions 406-420 are suitably repeated for each of the digital bits used to represent the sample values. If the samples are represented by sixteen-bit values, for example, the loop encompassing functions 406-420 may be repeated sixteen times, once for each bit. The bit that is considered during any particular iteration is referenced as the "active bit". Other embodiments may simply execute the process for the most significant bits (e.g., the most significant eight bits), or in any other manner.

At the beginning of each iteration of the loop 406-420, a count is taken (function 406) of the number of samples that are both in play and that have an active bit value equal to a first value. In the example shown in FIG. 4, the "first value" is a logic low ("0") value, although other embodiments could be equivalently created that would instead compare the bit of interest to a logic high ("1") value. In such cases, the sense of the rank may be specified from the opposite end of the list of values, and/or other modifications may be made as well.

This count 406 is then compared to the desired rank order to determine the value of the active bit in the desired sample (function 408). If the number of in play samples with an active bit equal to the first value exceeds the number of the desired rank order, then the value of the active bit in the desired sample must be equal to the first value (function 410). Conversely, if the number of in play samples with an active bit equal to the first value is less than the desired rank order, then the value of the active bit in the desired sample must be the opposite of the first value, that is, a "1" as illustrated in FIG. 4 (function 414).

Further, the samples that have an active bit that is different from the active bit of the desired value can be identified as no longer in play (functions 412, 416). In function 412 as illustrated in FIG. 4, for example, the active bit of the desired sample is determined to be a "0", so any samples with an active bit equal to "1" can be treated as no longer in play. Similarly, function 416 as illustrated in FIG. 4 would change the "in play" settings of any samples that had an active bit value equal to "o" after it was determined that the desired sample has an active bit equal to "1". Subsequent iterations of loop 408-420 would therefore not need to consider samples that were flagged as no longer in play, thereby speeding the computations.

Additionally, in the embodiment shown in FIG. 4, the rank order of the desired value may be adjusted (function 418) to account for the any samples that were changed to "not in play" in function 416. This adjustment reflects the position of the desired value within the samples remaining in play. While FIG. 4 shows function 418 as adjusting the rank order value that was determined in function 404, equivalent embodiments may use a separate variable to represent the rank order in comparison 408 and in adjustment function 418 so that the initially-determined rank order may be preserved for subsequent processing. Various embodiments, for example, could add an additional bit or other flag to track whether each sample value taken out of play is deemed to be higher or lower than the desired rank. This additional flag may obviate the need to adjust the rank order in function 418 in such embodiments.

Again, the particular logic values illustrated in FIG. 4 could be readily toggled or otherwise logically adjusted in any number of equivalent embodiments. For example, some embodiments could adjust the "greater-than" comparison shown in function 408 to be a "less than" comparison, in which case, the adjustment function 418 may be performed in conjunction with functions 410 and 412 rather than functions 414 and 416 as shown. Many different logical equivalents could be formulated as desired.

After all of the desired bits are processed (function 420), the desired value may be output as desired (function 422). The desired value may be output as an argument returned from a programming function, routine or other procedure in some implementations. Alternately, the desired value may be latched or otherwise output from a hard-wired digital logic circuit (e.g., a CGA, ASIC or the like) in other implementations. Other embodiments may provide the output value in any format using any sort of hardware, software, firmware and/or other logic, as desired.

Generally speaking, each of the various steps in system 200 and processes 300, 400 may be performed by computing hardware, firmware and/or software executing in any computing environment. In an exemplary embodiment, some or all of these processes are implemented in software instructions that are associated with processing module 114 (operating alone or in conjunction with acquisition module 112 and/or output module 120), that can be stored in memory 118 or in any other mass storage, and that can be executed on processor 116. Other embodiments may be implemented in dedicated processing hardware, firmware and/or other means as desired, including any sort of common gate array, ASIC, or other programmed or programmable digital logic as desired. The techniques described in FIGS. 2-4, for example, may be very efficiently implemented using CGA structures in some embodiments. The rank order filter shown in FIG. 4, for example, may be very efficiently implemented in CGA structures, particularly if such structures would otherwise have under-utilized look up table capacity.

Various systems and techniques for processing data are therefore described. As noted at the outset, these techniques and systems may be variously applied in any military, industrial, commercial, personal or other setting for image enhancement, target/object recognition, signal processing, filtering and/or other benefits as appropriate. Any number of modifications and enhancements could be formulated from the various examples described herein. For example, the decomposition and other concepts described herein for computing first order changes could be readily applied to second, third or higher order changes as well.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method executable by a digital processing logic to automatically identify a target in an image having a plurality of pixels, each pixel being associated with a pixel value, the method comprising:
    selecting a subset of the plurality of pixels in the image;
    determining first slope estimates representative of various samples of a slope measurement in a first direction of the image, each first slope estimate based upon a difference in the pixel values of at least some of the pixels in the subset scaled using a value that is based upon the distance between the pixels in the image representing an average slope per pixel;
    determining, using a first rank order filter implemented with the digital processing logic, a first slope from the first slope estimates;
    determining second slope estimates representative of various samples of a slope measurement in a second direction of the image, each second slope estimate based upon a difference in the pixel values of at least some of the pixels in the subset scaled using a value that is based upon the distance between the pixels in the image representing an average slop per pixel;
    determining, using a second rank order filter implemented with the digital processing logic, a second slope from the second slope estimates;
    compensating the values of at least some of the plurality of pixels in the digital processing logic for the effects of a sloping background using the first and the second slopes, thereby creating a plurality of compensated values;
    processing the compensated values by the digital processing logic to determine if the target is present in at least one of the plurality of pixels; and
    providing an output from the digital processing logic that indicates if the target is present.

2. A method executable by a digital processing logic to automatically identify a target in an image having a plurality of pixels, each pixel being associated with a pixel value, the method comprising:
    selecting a subset of the plurality of pixels in the image;
    determining first slope estimates representative of various samples of a slope measurement in a first direction of the image based upon the pixel values of at least some of the pixels in the subset;
    determining, using a first rank order filter implemented with the digital processing logic, a first slope from the first slope estimates;
    determining second slope estimates representative of various samples of a slope measurement in a second direction of the image based upon the pixel values of the at least some of the pixels in the subset;
    determining, using a second rank order filter implemented with the digital processing logic a second sloe from the second sic e estimates;
    compensating the values of at least some of the plurality of pixels in the digital processing logic for the effects of a sloping background using the first and the second slopes, thereby creating a plurality of compensated values;
    processing the compensated values by the digital processing logic to determine if the target is present in at least one of the plurality of pixels; and
    providing an output from the digital processing logic that indicates if the target is present,
    wherein the determining the first slope estimates comprises pairing each of the at least some of the pixels to create a plurality of pixel pairs, wherein each first pixel in the at least some of the pixels is paired with another pixel in the at least some of the pixels that is displaced from the first pixel in the first direction,
    wherein the determining the first slope estimates comprises, for each of the pixel pairs, computing a difference between the pixel value associated with the first pixel and the pixel value associated with the other pixel, and
    wherein the determining the first slope estimates further comprises, for each of the pixel pairs, scaling the computed difference using a value that is based upon the distance between the first pixel and the other pixel in the image to determine the slope estimate representing an average slope per pixel.

3. The method of claim 2 wherein the determining the first slope comprises determining, by the digital processing logic, a rank order value of the slope estimates computed for each of the pixel pairs.

4. The method of claim 3 wherein each of the first slope estimates is represented in the digital processing logic by a number of digital bits having either a first value or an opposite value, and wherein determining, using a first rank order filter, a first slope from the first slope estimates comprises:
    determining a desired rank order of the first slope based upon a total number of first slope estimates; and
    for each active bit of in the digital bits:
        counting the number of first slope estimates that are in play and that have a value of the active bit that is equal to the first value, wherein a slope estimate is in play if the slope estimate has not been determined to be above or below the desired rank;

if the count is not less than the desired rank order, providing the first value as a next bit of the rank order value and treating each of the first slope estimates having the value of the active bit that is equal to the opposite value as no longer in play; and if the count is less than the desired rank order, providing the opposite value as the next bit of the rank order value, treating each of the first slope estimates having the value of the active bit equal to the first value as no longer in play, and adjusting the desired rank order of the first slope to account for the first slope estimates that are no longer in play to reflect the position of the desired value within the samples remaining in play.

5. A method executable by a digital processing logic to automatically identify a target in an image having a plurality of pixels, each pixel being associated with a pixel value, the method comprising:

selecting a subset of the plurality of pixels in the image;

determining first slope estimates representative of various samples of a slope measurement in a first direction of the image based upon the pixel values of at least some of the pixels in the subset, wherein the determining the first slope estimates comprises grouping each of the at least some of the pixels to create a first grouping of pixels, wherein each first pixel in the at least some of the pixels is grouped with another pixel in the at least some of the pixels that is displaced from the first pixel in the first direction;

determining, using a first rank order filter implemented with the digital processing logic, a first slope from the first slope estimates;

determining second slope estimates representative of various samples of a slope measurement in a second direction of the image based upon the pixel values of the at least some of the pixels in the subset, wherein the determining the second slope estimates comprises grouping each of the at least some of the pixels to create a second plurality of pixel groups, wherein each first pixel in the at least some of the pixels is grouped with a second pixel in the at least some of the pixels that is displaced from the first pixel in the second direction;

determining, using a second rank order filter implemented with the digital processing logic, a second slope from the second slope estimates;

compensating the values of at least some of the plurality of pixels in the digital processing logic for the effects of a sloping background using the first and the second slopes, thereby creating a plurality of compensated values;

processing the compensated values by the digital processing logic to determine if the target is present in at least one of the plurality of pixels; and providing an output from the digital processing logic that indicates if the target is present, wherein the determining the first and second slope estimates comprises, for each of the first and second pixel pairs, computing a difference between the pixel values and scaling the computed difference using a value that is based upon the distance between the first or second pixel and the other pixel to determine the slope estimate representing an average slope per pixel.

6. The method of claim 5 wherein the determining the first slope by the first rank order filter comprises determining a median slope in the first direction from all of the first slope estimates computed for each of the first pixel pairs and wherein the determining the second slope by the second rank order filter comprises determining a median slope in the second direction from all of the second slope estimates computed for each of the second pixel pairs.

7. The method of claim 1 wherein the compensating comprises linearly superimposing the effects of the first and second slopes to remove the effects of the sloping background from the pixel values for each of the pixels in the subset, determining an estimate of a background value from the compensated pixel values, and further compensating the at least one of the plurality of pixels based upon the background value.

8. The method of claim 1 wherein the compensating comprises, for each pixel of the at least some of the pixels, subtracting the first and second slopes from the pixel value that is associated with the pixel.

9. The method of claim 1 further comprising selecting the at least some of the pixels in the subset to exclude any undesired pixels.

10. A method executable by processing logic to automatically identify a target in a dataset having a plurality of samples, each sample being associated with a sample value, the method comprising:

selecting a subset of the plurality of samples in the dataset;

determining, with the processing logic, first slope estimates representative of various samples of a slope measurement in a first direction based upon the sample values of at least some of the samples in the subset;

determining, using a rank order filter, a first slope from the first slope estimates;

determining, with the processing logic, second slope estimates representative of various samples of a slope measurement in a second direction of the dataset based upon the sample values of at least some of the samples in the dataset;

determining, using a second rank order filter, a second slope from the second slope estimates;

compensating the sample values of at least some of the plurality of samples in the subset using the first slope to create a plurality of compensated values with the processing logic; and determining if the target is present in at least one of the plurality of samples by processing the compensated values with the processing logic, wherein the first and second slope estimates are each based upon a difference in the values of two samples in the dataset, wherein each of the slope estimates is represented in the processing logic by a number of digital bits each having either a first value or an opposite value.

11. The method of claim 10 wherein determining the first and second slopes each comprise:

determining a rank order of the slope based upon a total number of slope estimates; and for each active bit of in the digital bits:

counting the number of slope estimates that are in play and that have a value of the active bit that is equal to the first value, wherein a slope estimate is in play if the slope estimate has not been determined to be above or below the desired rank;

if the count is not less than the rank order, providing the first value as a next bit of the slope and treating each of the slope estimates having the value of the active bit that is equal to the opposite value as no longer in play; and if the count is less than the rank order, providing the opposite value as the next bit of the slope, treating each of the slope estimates having the value of the active bit equal to the first value as no longer in play, and adjusting the rank order of the slope to account for the slope estimates that are no longer in play to reflect the position of the desired value within the samples remaining in play.

12. A computational system for processing an image to automatically identify a target, said image comprising a plurality of pixels each having a pixel value, the system comprising:
- an acquisition module configured to receive at least one image;
- a processing module comprising processing logic, a first rank order filter and a second rank order filter, wherein the processing module is configured to select a window of the plurality of pixels that encompasses a detectable area of at least one pixel and to determine a plurality of first slope estimates representative of various samples of a slope measurement in a first direction of the from one side of the window to another based upon the pixel values of at least some of the pixels in the window outside the detectable area using the processing logic, determine a first slope from the first slope estimates using the first rank order filter, to determine a plurality of second slope estimates representative of various samples of a slope measurement in a second direction of the from one side of the window to another based upon the pixel values of the at least some of the pixels in the window outside the detectable area using the processing logic, determine a second slope from the second slope estimates using the second rank order filter, to compensate the values of at least some of the pixels in the detectable area for the effects of a sloping background using the first and the second slopes thereby creating at least one compensated value in the detectable area, and to determine based on the compensated values if the target is present in at least one of the pixels in the detectable area; and
- an output module configured to provide an output that indicates if the target is present.

13. The system of claim 12 wherein the first and second slope estimates are each based upon a difference in the sample values of two samples in the window scaled using a value that is based upon the distance between the pixels in the image representing an average slope per pixel.

14. The system of claim 12 wherein the processing module is further configured to select the at least some of the pixels to exclude any non-functioning pixels.

15. The system of claim 12 wherein at least one of the first and second rank order filters is implemented in a configurable gate array.

16. The system of claim 12 wherein at least one of the first and second rank order filters comprises a median filter.

17. The system of claim 12 wherein the processing module is configured to compensate the values by superimposing the first and second slopes to remove the effects of the sloping background from the values for each of the pixels in the window.

18. The system of claim 17 wherein the processing module is further configured to compensate the values by estimating a background level after the first and second slopes are superimposed on the pixel values and then subtracting the estimated background level from the pixel values for each of the at least some of the pixels.

19. The system of claim 12 wherein at least some of the plurality of pixels in the window outside the detectable area are compensated in the digital processing logic for the effects of a sloping background using the first and the second slopes, thereby creating a plurality of compensated values across the window.

20. The system of claim 19 wherein said at least some of the plurality of pixels in the window are compensated in the digital processing logic by scaling the first slope by the displacement of the pixel from the detectable area in the first direction and by scaling the second slope by the displacement of the pixel from the second area in the second direction.

21. The system of claim 12 wherein the number of first slope estimates exceeds the number of pixels in the detectable area.

22. A method executable by a digital processing logic to automatically identify a target in an image having a plurality of pixels, each pixel being associated with a pixel value, the method comprising:
- selecting a window of the plurality of pixels in the image, said window encompassing a detectable area of at least one pixel within the window;
- determining a plurality of first slope estimates representative of various samples of a slope measurement in a first direction of the image from one side of the window to another based upon the pixel values of at least some of the pixels in the window outside the detectable area;
- determining, using a first rank order filter implemented with the digital processing logic, a first slope from the first slope estimates;
- determining a plurality of second slope estimates representative of various samples of a slope measurement in a second direction of the image from one side of the window to another based upon the pixel values of the at least some of the pixels in the window outside the detectable area;
- determining, using a second rank order filter implemented with the digital processing logic, a second slope from the second slope estimates;
- compensating the values of at least some of the pixels in the detectable area in the digital processing logic for the effects of a sloping background using the first and the second slopes, thereby creating at least one compensated value in the detectable area;
- processing the compensated values by the digital processing logic to determine if the target is present in at least one of the plurality of pixels in the detectable area; and
- providing an output from the digital processing logic that indicates if the target is present.

23. The method of claim 22 wherein each first slope estimate is based upon a difference in the pixel values of at least some of the pixels in the window scaled using a value that is based upon the distance between the pixels in the image representing an average slope per pixel.

24. The method of claim 22 wherein at least some of the plurality of pixels in the window outside the detectable area are compensated in the digital processing logic for the effects of a sloping background using the first and the second slopes, thereby creating a plurality of compensated values across the window.

25. The method of claim 24 wherein said at least some of the plurality of pixels in the window are compensated in the digital processing logic by scaling the first slope by the displacement of the pixel from the detectable area in the first direction and by scaling the second slope by the displacement of the pixel from the second area in the second direction.

26. The method of claim 22 wherein the number of first slope estimates exceeds the number of pixels in the detectable area.

* * * * *

UNITED STATES PATENT AND TRADEMARK OFFICE
CERTIFICATE OF CORRECTION

PATENT NO. : 8,416,986 B2
APPLICATION NO. : 12/608374
DATED : April 9, 2013
INVENTOR(S) : Darin S. Williams It is certified that error appears in the above-identified patent and that said Letters Patent is hereby corrected as shown below:

In the Claims

In column 17, claim 1, line 64, delete "slop" and insert --slope--;

In column 18, claim 2, line 27, delete "sloe" and insert --slope--;

In column 18, claim 2, line 28, delete "sic e" and insert --slope--.

Signed and Sealed this
Fourteenth Day of May, 2013

Teresa Stanek Rea
*Acting Director of the United States Patent and Trademark Office*